United States Patent
Klopfleisch et al.

(10) Patent No.: US 11,137,615 B2
(45) Date of Patent: Oct. 5, 2021

(54) ILLUMINATION DEVICE FOR A PROJECTOR HAVING A LIGHT MODULATOR

(71) Applicant: Carl Zeiss Jena GmbH, Jena (DE)

(72) Inventors: Peter Klopfleisch, Jena (DE); Dirk Doering, Erfurt (DE); Bryce Anton Moffat, Jena (DE); Alexander Gratzke, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 19 days.

(21) Appl. No.: 16/684,574

(22) Filed: Nov. 14, 2019

(65) Prior Publication Data
US 2020/0159031 A1   May 21, 2020

(30) Foreign Application Priority Data

Nov. 15, 2018   (DE) .................. 102018128744.5

(51) Int. Cl.
| | | |
|---|---|---|
| *G03B 21/20* | (2006.01) | |
| *H04N 9/31* | (2006.01) | |
| *G02B 27/09* | (2006.01) | |

(52) U.S. Cl.
CPC ..... *G02B 27/0905* (2013.01); *G02B 27/0994* (2013.01); *G03B 21/208* (2013.01); *H04N 9/3164* (2013.01)

(58) Field of Classification Search
CPC .............. G03B 21/208; G03B 21/2013; G03B 21/2033; H04N 9/3152; H04N 9/3164; G02B 27/0905; G02B 27/0994
See application file for complete search history.

(56) References Cited

U.S. PATENT DOCUMENTS

| | | |
|---|---|---|
| 9,348,207 B2 | 5/2016 | Yamamoto |
| 2006/0238720 A1 | 10/2006 | Lee et al. |
| 2006/0274278 A1 | 12/2006 | Lee et al. |
| 2007/0064202 A1 | 3/2007 | Moffat et al. |
| 2014/0375958 A1 | 12/2014 | Kuwata et al. |
| 2015/0341605 A1 | 11/2015 | Yamada et al. |
| 2017/0371150 A1 | 12/2017 | Krause et al. |
| 2019/0219913 A1* | 7/2019 | Akiyama ............. G03B 21/008 |

OTHER PUBLICATIONS

Leaflet Philips: Digital Projection Lighting, HLD LED technology. Where brilliance meets intelligence; Discover Philips HLD LED technology; 2018; 2 pages.

* cited by examiner

*Primary Examiner* — Ryan D Howard
(74) *Attorney, Agent, or Firm* — Skaar Ulbrich Macari, P.A.

(57) ABSTRACT

An illumination apparatus for a projector that includes a light modulator is provided. The illumination apparatus includes a first illumination module emitting first radiation, a second illumination module emitting second radiation, a light mixing rod extending in the axial direction and a superposition unit, which superposes the first and second radiation and couples this into the light mixing rod. The superposition unit includes a first imaging optical unit which focuses the first radiation into the light mixing rod such that a first focus is present, and a second imaging optical unit which focuses the second radiation into the light mixing rod such that a second focus is present. The first focus is spaced apart from the second focus in the axial direction.

18 Claims, 5 Drawing Sheets

ILLUMINATION DEVICE FOR A PROJECTOR HAVING A LIGHT MODULATOR

PRIORITY

This application claims the benefit of German Patent Application No. 10 2018 128 744.5, filed on 15 Nov. 2018, which is hereby incorporated herein by reference in its entirety.

FIELD

The present invention relates to an illumination apparatus for a projector comprising a light modulator.

BACKGROUND

In projectors, such as digital projectors, the light modulator can be illuminated sequentially in time by light of different colors from different wavelength ranges in order to produce color component images sequentially in time, said color component images being perceivable as a multi-colored image by an observer only in the case of a superposition in time.

Use is frequently made of three spectrally different light sources, which emit light with three spectrally different wavelength ranges (e.g., red, green and blue light). Using this, it is possible to produce the desired color component images and a defined white point. In order to achieve a uniform illumination of the light modulator, the light of the light sources is frequently guided through a light mixing rod, at the output surface of which an intensity distribution that is as homogeneous as possible is present for the light of each of the light sources.

Currently available light sources, e.g., for the colors of red, green and blue, have the problem that at least one of the light sources differs from the other light sources in terms of its source size (effective emission surface) and emission angle (angle spectrum).

SUMMARY

The disclosure includes an illumination apparatus for a projector comprising a light modulator, said illumination apparatus being cost-effective and optically efficiently coupling the light of the light sources into the light mixing rod.

Since the first and the second focus are focused into the light mixing rod in the illumination apparatus according to the invention and since there is an axial distance between the first and the second focus, the maximum possible etendue of each illumination module is advantageously transferred. By positioning the paraxial foci within the light mixing rod at a distance from one another, the first and second imaging optical unit can be optimized on the basis of the coupling efficiency, wherein there preferably is only an assessment of the luminous flux within the used aperture of the optical unit following the light mixing rod. As a result, as much used light as possible can be coupled into the light mixing rod. Here, used light is understood to mean, in particular, the entire spectrally useful part of the light with an aperture angle of less than or equal to a maximum aperture angle of an optical unit following the light mixing rod. Additionally, the possibly different aberrations of the two imaging optical units can be taken into account for the purposes of an efficient transfer of the etendue. Further, a compact structure is present, with a high coupling efficiency and cost-effective standard optical elements (and, in particular, standard lenses).

In particular, the distance, in the axial direction, of the first focus from the input of the light mixing rod and the distance, in the axial direction, of the second focus from the input of the light mixing rod can be greater than 30 Rayleigh lengths. In the employed spectrum, the Rayleigh length lies between 1.8 and 2.8 µm on account of the input-coupled numerical aperture of 0.5, for example. By contrast, the distance of the first or second focus from the input can be at least 0.1 mm.

In particular, the distance of the first and second focus can lie in the range of 0.1 to 2 mm.

Further, the superposition unit can comprise at least one beam unifier. By way of example, the beam unifier can be realized as a splitter cube, dichroic splitter, pole splitter or grating.

The first illumination module preferably emits blue radiation or light of a first color. The second illumination module can emit red or green radiation or light of a second or third color, which is preferably different from the first color. The colors can be primary colors.

The first imaging optical unit may comprise a first collimator, a first 4f relay optical unit and a first focusing optical unit, in this order. The first 4f relay optical unit can be formed exclusively from spherical lenses. The first 4f relay optical unit can have an imaging scale of 1.

Further, the first imaging optical unit can have such an embodiment that the chief rays of different field points of the first illumination module extend in convergent fashion between the focusing optical unit and the light mixing rod. Expressed differently, there is a convergent chief beam path of the first radiation of the first illumination module upon coupling into the light mixing rod.

The second imaging optical unit can comprise a second collimator and a second 4f relay optical unit and the focusing optical unit.

Further, a third illumination module can be provided, the latter emitting third radiation (which is, e.g., green or red radiation or light of the third or second color such that the first to third illumination module emit red, green and blue radiation or light of three colors). The superposition unit can comprise a third imaging optical unit which focuses the third radiation in the light mixing rod such that a third focus is present, the latter being spaced apart in the axial direction from the first focus and/or second focus.

The third imaging optical unit may comprise a third collimator, a third 4f relay optical unit and the focusing optical unit, in this order.

In particular, the second 4f relay optical unit may comprise a third partial optical unit and a fourth partial optical unit and the third 4f relay optical unit may comprise a fifth partial optical unit and the fourth partial optical unit. Hence, the fourth partial optical unit can be a constituent part of both the second and the third 4f relay optical unit. The second and the third 4f relay optical unit can have an imaging scale of 1.

The first collimator can be formed of at least two spherical lenses. Further, the second collimator may comprise an aspherical lens. The same applies to the third collimator. The first 4f relay optical unit can be formed (exclusively) with spherical lenses.

The focusing optical unit may comprise an aspherical lens.

The light mixing rod can be a so-called integrator and, in particular, a hollow rod.

The first, second and/or third imaging optical unit can be embodied without achromatization. As a result, cost-effective standard lenses can be used.

The first illumination module and the second and/or third illumination module can be disposed in such a way that chief rays of the light rays emitted from the center of the respective emission surface of the illumination modules extend parallel to one another and/or lie in a plane.

Further, a projector is provided with a light modulator and an illumination apparatus according to the invention (including all the aforementioned developments). By way of example, such a projector can be used in flight simulation (e.g., in a flight simulator), as a planetarium projector or as any other projector.

In particular, the light modulator is a planar light modulator and can be embodied, e.g., as a tilt mirror matrix, LCD module or else LCoS module. Moreover, the projector may comprise a control unit for controlling the modulator and the illumination modules, and a projection optical unit that projects the image produced by means of the light modulator onto a projection surface.

In particular, the projector is embodied in such a way that the various component images are produced sequentially in time. Here, the component images are produced so quickly in succession that these can no longer be resolved individually by a user who, instead, only still perceives the superposition of the component images as an image. To this end, the control unit can actuate the illumination modules in such a way that these are activated and deactivated (switching in the kHz range is possible) sequentially in time. Hence, the modulator can be illuminated with different colors sequentially in time, as a result of which color component images can be produced, which the user then can only still perceive in superposition. Naturally, at least two illumination modules may also be activated simultaneously for certain phases should this be desired, e.g., for a higher light output.

The projector may comprise two light modulators disposed in succession. In this case, in particular, provision is made of a modulator optical unit that images the first light modulator onto the second light modulator. In particular, the modulator optical unit can be embodied as a 1:1 optical unit. The maximum contrast of the projector is increased by the provision of two light modulators switched in succession.

It goes without saying that the aforementioned features and those yet to be explained below can be used not only in the combinations specified but also in other combinations or on their own, without departing from the scope of the present invention.

The invention will be explained in more detail below on the basis of exemplary embodiments, with reference being made to the attached drawings, which likewise disclose features essential to the invention. These exemplary embodiments serve merely for elucidation and should not be interpreted as restrictive. By way of example, a description of an exemplary embodiment with a multiplicity of elements or components should not be interpreted to the effect that all these elements or components are necessary for implementation purposes. Rather, other exemplary embodiments also may contain alternative elements and components, fewer elements or components or additional elements or components. Elements or components of different exemplary embodiments can be combined with one another, unless indicated otherwise. Modifications and developments which are described for one of the exemplary embodiments may also be applicable to other exemplary embodiments. In order to avoid repetition, the same elements or corresponding elements in the various figures are denoted by the same reference signs and are not explained a number of times.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

The invention is explained in yet more detail below with the aid of embodiment examples with reference to the attached drawings, which also disclose features essential to the invention. These embodiment examples merely serve the purpose of illustration and are not to be interpreted as limiting. For example, a description of an embodiment example with a plurality of elements or components is not to be interpreted to the effect that all of these elements or components are necessary for the implementation. Rather, other embodiment examples can also contain alternative elements and components, fewer elements or components or additional elements or components.

Elements or components of different embodiment examples can be combined with each other, unless otherwise indicated. Modifications and alterations which are described for one of the embodiment examples can also be applicable to other embodiment examples. To avoid repetitions, the same or corresponding elements are given the same reference numbers in different figures and are not explained repeatedly.

Figure 1:
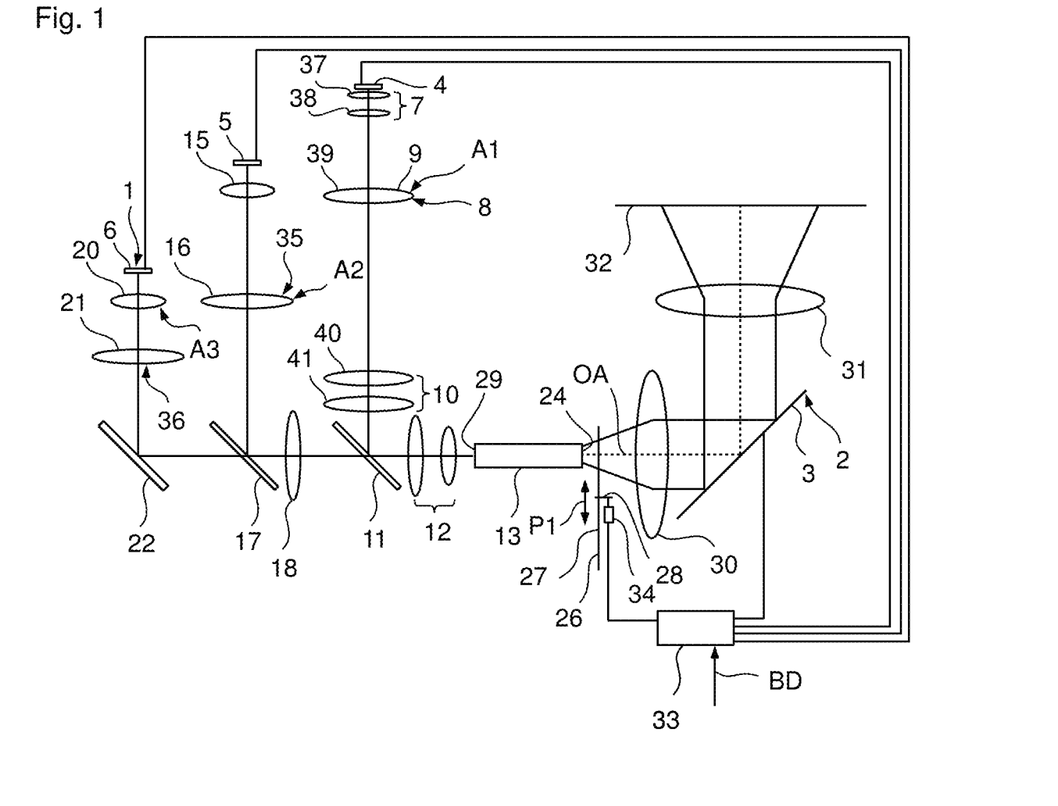
FIG. 1 is a schematic illustration of a first exemplary embodiment of the projection apparatus according to the invention in a projector according to the invention.

In the embodiment shown in FIG. 1, the illumination apparatus 1 according to the invention is provided in a projector 2 according to the invention, the latter comprising a light modulator 3 (e.g., a tilt mirror matrix).

The illumination apparatus 1 comprises a first illumination module 4, which emits blue light, a second illumination module 5, which emits green light, and a third illumination module 6, which emits red light.

The illumination device 1 comprises a first collimator 7 for the light of the first illumination module 4, a first relay optical unit 8 comprising a first and second partial optical unit 9, 10 being disposed downstream of said first collimator, and a first beam unifier 11. Consequently, the blue light of the first illumination module 4 passes through the first collimator 7 and the first relay optical unit 8 and is deflected by the first beam unifier 11 in the direction of a focusing optical unit 12, which focuses the blue light into a light mixing rod 13 such that a first focus is present.

Further, the illumination apparatus 1 comprises a second collimator 15, a third partial optical unit 16, a second beam unifier 17 and a fourth partial optical unit 18, which are disposed successively in this order, for the light of the second illumination module 5. Consequently, the light of the second illumination module 5 passes through the second collimator 15 and the third partial optical unit 16, is deflected by the second beam unifier 17 in the direction of the fourth partial optical unit 18, passes through the fourth partial optical unit 18 and the first beam unifier 11 and is then focused by the focusing optical unit 12 into the light mixing rod 13 such that a second focus is present.

For the light of the third illumination module 6, the illumination apparatus 1 comprises a third collimator 20, a fifth partial optical unit 21 and a deflection mirror 22, which are disposed in succession in this order. The light of the third illumination module 6 passes through the third collimator 20 and the fifth partial optical unit 21, is deflected by the deflection mirror 22 in the direction of the second beam unifier 17, passes through the second beam unifier 17, the fourth partial optical unit 18 and the first beam unifier 11 and is then focused by the focusing optical unit 12 into the light mixing rod 13 such that a third focus is present.

The light of the first, second and third illumination module 4, 5, 6 is guided in the light mixing rod 13 to the output 24 of the latter, at which, in a manner known per se, a homogeneity of the intensity distribution that is as high as possible is present for each of the three colors (blue, green and red).

A filter wheel 26 with a filter surface 27 can be disposed downstream of the light mixing rod 13. By way of example, the filter surface 27 can have a ring-shaped embodiment, as is schematically indicated in the plan view of FIG. 2, and comprises two surface segments lying next to one another in the rotation direction R, it being possible to refer to said surface segments as first surface segment VIS and as second surface segment IR. The first surface segment VIS transmits light from the visible wavelength range and radiation from the infrared range. The second surface segment only transmits radiation from the infrared range and no light from the visible wavelength range.

Figure 2:
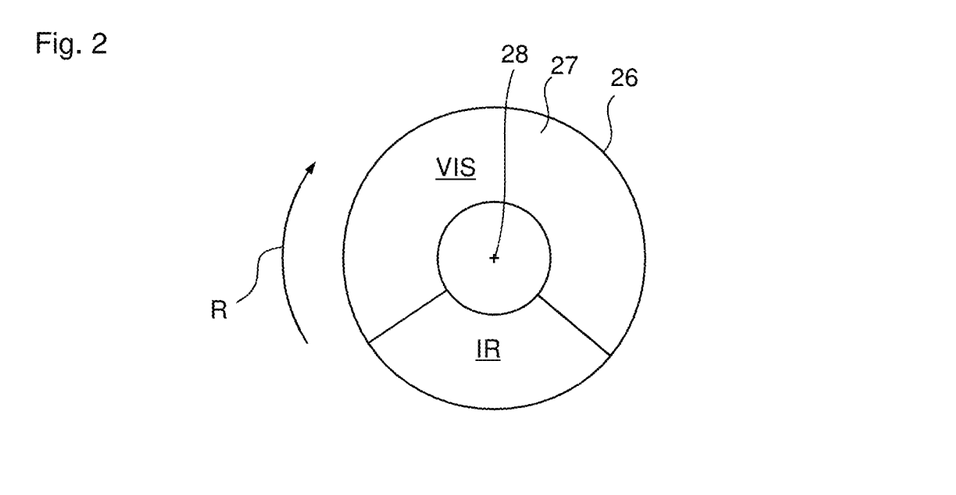
FIG. 2 is a plan view of the filter wheel of FIG. 1.

The filter surface 27 of the filter wheel 26 is disposed perpendicular to, or at an angle unequal to 90° with respect to, the optical axis OA of the illumination apparatus 1 such that only a part of the filter surface 27 stands in the illumination beam path at all times. The filter wheel 26 is embodied in such a way that the filter surface 27 is rotatable about an axis 28, wherein the axis 28 may extend parallel to the optical axis OA or include an angle of greater than 0° with the optical axis OA (and consequently no longer be parallel to the optical axis OA).

The projector 2 further comprises an illumination optical unit 30 disposed downstream of the filter wheel 26 or the light mixing rod 13, said illumination optical unit directing the light emerging from the output 24 of the light mixing rod 13 (which light has possibly passed through the filter wheel 26) onto the light modulator 3 in such a way that the latter is illuminated as uniformly as possible. The light modulator 3 modulates the light in a manner known per se and the light used for image presentation (so-called one light) is projected by way of a projection optical unit 31 onto a projection surface 32 in order to produce, at said location, an image to be presented.

The projector 2 further comprises a control unit 33, which actuates the light modulator 3, a drive 34 of the filter wheel 26 (if a filter wheel 26 is provided) and the first to third illumination module 4-6 in such a way on the basis of supplied image data BD that the desired images are projected.

To this end, the illumination modules 4-6 are actuated in such a way that red, green and blue component images are produced so quickly successively in time by means of the modulator 3 and presented by means of the projection optical unit 31 on the projection surface 32 that an observer cannot resolve these in time and consequently perceives the superposition as a multi-colored image.

By way of example, the filter wheel 26 serves to produce infrared images in flight simulators and can be moved out of the beam path, as indicated by the double-headed arrow P1. Thus, the illumination apparatus 1 according to the invention or the projector 2 according to the invention can be used in a flight simulator in order to be able to train night-vision conditions using a night-vision device. To this end, use can be made, e.g., of the infrared component of the light of the second and/or third illumination module 5, 6, with the filter wheel 26 projecting into the beam path, as illustrated schematically in FIG. 1. Preferably, filters not plotted here can be used to block the infrared component of the illumination modules 4-6, the infrared component of which should not be used for producing the infrared images. On account of the rotating filter wheel, it is consequently possible, for example, to simultaneously produce and project a desired infrared image and an image with light from the visible wavelength range. Consequently, it is possible to produce desired infrared images, which a user of the flight simulator can perceive using their night-vision device. By way of example, flying and operating an aircraft or helicopter can be trained using such a flight simulator.

The filter wheel 26 can be moved out of the beam path when no infrared images are intended to be produced. In this case, the light leaving the integrator 13 directly strikes the illumination optical unit 30.

In addition to the spectrum of the emitted light, the second and third illumination module 5, 6 also differ from the first illumination module in that their respective effective emission surface is greater than the effective emission surface of the first illumination module 4 and in that the respective emission angle or the respective angle spectrum of the light emitted by the second and third illumination module 5, 6 is smaller than the angle spectrum of the light emitted by the first illumination module 4.

Since the effective emission surface and the angle spectrum are the same for the second and third illumination module 5, 6, the second and third collimator 15, 20 can have the same embodiment. Here, use is made of an aspherical lens which is a standard asphere (a so-called catalog asphere).

Figure 3:
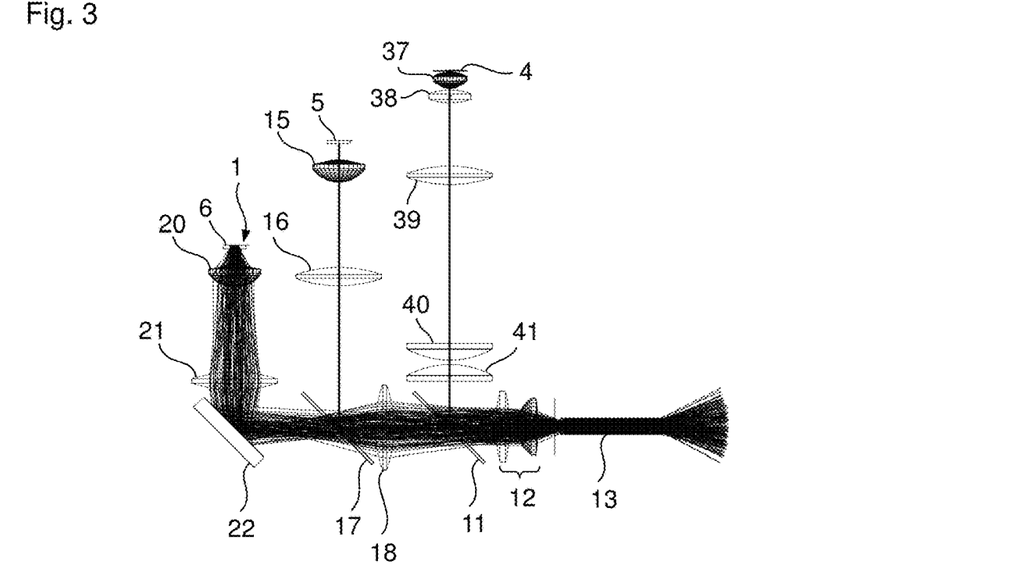
FIG. 3 is a schematic illustration for explaining the beam path of the third illumination module.
Figure 4:
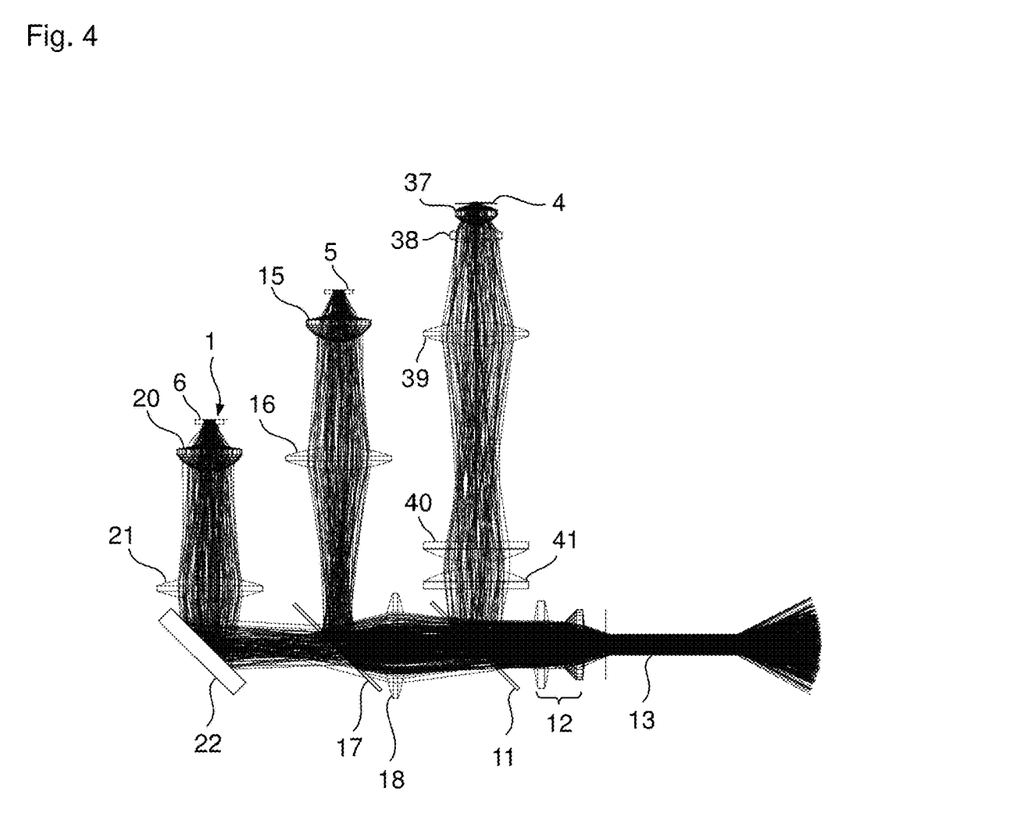
FIG. 4 is a schematic illustration for explaining the beam paths of the first to third illumination module.

Together with the fourth partial optical unit 18, the fifth partial optical unit 21 forms a third relay optical unit 36. Then, the light of the third illumination module 6 that has passed through the third relay optical unit 36 is focused into the light mixing rod 13 by means of the focusing optical unit 12, as illustrated in more detail in FIG. 3. For the purposes of a better overview, FIG. 3 only illustrates the beam profile for the light emitted by the third illumination module 6, whereas FIG. 4 illustrates the beam profile for the three illumination modules 4-6.

Figure 5:
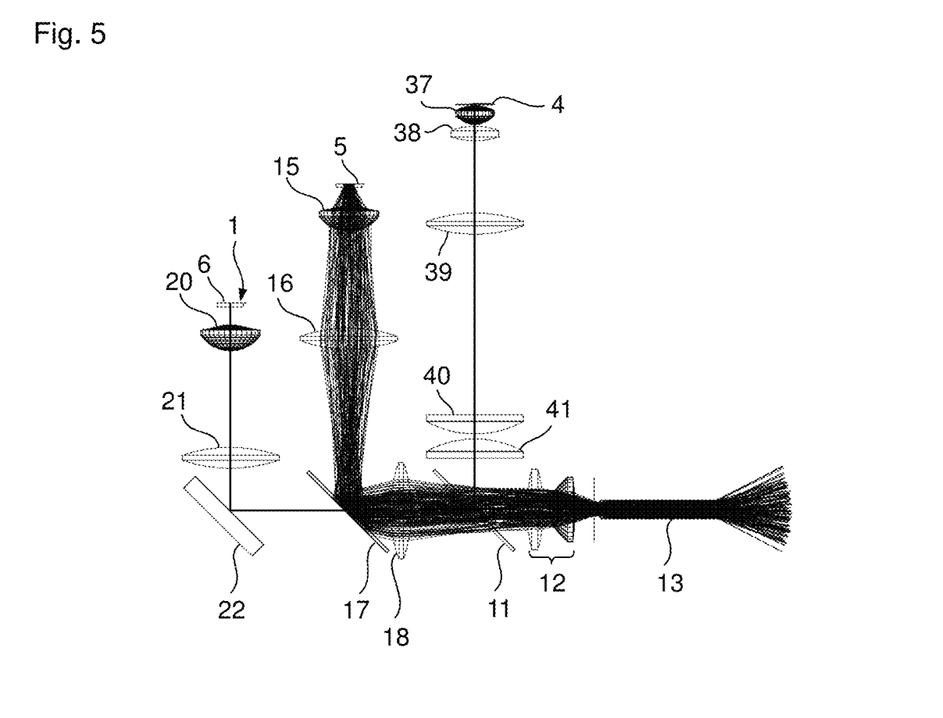
FIG. 5 is a schematic illustration for explaining the beam path of the second illumination module.

At least together with the fourth partial optical unit 18, the third partial optical unit 16 forms a second relay optical unit 35 for the light of the second light modulator 5. Since, as mentioned above, the effective emission surface and the angle spectrum are the same in the second and third illumination module 5, 6, the fourth partial optical unit 18 as part of the second and third relay optical unit 35, 36 can consequently be used for the second and third illumination module 5, 6. The light of the second illumination module 5 passes through the second collimator 15 and the second relay optical unit 35, which is formed by the third partial optical unit 16 and the fourth partial optical unit 18, and is then focused into the light mixing rod 13 by means of the focusing optical unit 12, as illustrated in more detail in FIG. 5.

Figure 6:
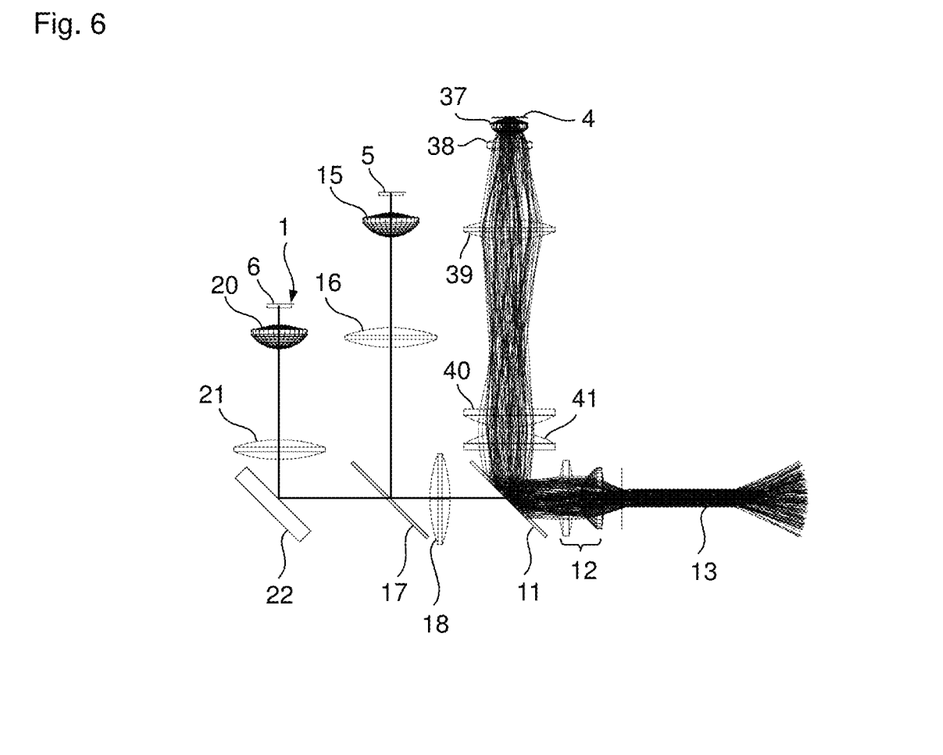
FIG. 6 is a schematic illustration for explaining the beam path of the first illumination module.

The beam profile for the light of the first illumination module 4 is illustrated in FIG. 6. Since the first illumination module 4 has a smaller size and a larger emission angle, it requires an assembled collimation optical unit with a shorter focal length. Therefore, the first collimator 7 comprises a first and second collimator optical unit 37, 38. Additionally, the outlay for the first relay optical unit 8 disposed downstream of the first collimator 7 is slightly increased on account of the stronger aberrations. However, use can be made of spherical lenses 39, 40, 41 with standard dimensions (so-called catalog lenses). However, since the distance between the spherical lens 39 on the one hand and the spherical lenses 40, 41 on the other hand is relatively large, the region lying therebetween can be used as input-coupling region for light of a further illumination module (not shown).

Together with the first relay optical unit 8 and the focusing optical unit 12, the first collimator 7 therefore forms a first imaging optical unit A1 for the first illumination module 4. Together with the second relay optical unit 35 and the focusing optical unit 12, the second collimator 15 forms a second imaging optical unit A2 for the second illumination module in the same way. Further, together with the third relay optical unit 36 and the focusing optical unit 12, the third collimator 20 forms a third imaging optical unit A3.

As a result of the relay optical units 8, 35 and 36, which, e.g., can each be embodied as 4f relay optical units with an imaging scale of 1, the necessary installation space for combining the beam paths of the three illumination modules 4 to 6 by way of the two beam unifiers 11, 17 is present and, moreover, the strongly divergent beam paths of the individual illumination modules 4-6 are transferred virtually without losses. The deflection mirror 22 is a protected silver mirror and only provided to meet the specific installation space requirements in the present exemplary embodiment. Naturally, the deflection mirror 22 can also be omitted if the third illumination module 6 is disposed in a correspondingly different manner such that the third illumination module 6 emits the light in a direction that is parallel to the direction that follows the deflection by the mirror 22 according to FIG. 1. However, it is advantageous for the three illumination modules 4-6 to have the same alignment. This is understood to mean, in particular, that the chief rays of the light beams emitted from the center of the emission surfaces extend parallel to one another. Further, the illumination modules 4-6 are disposed in such a way that the aforementioned chief rays lie in a plane, which once again leads to a compact structure.

Figure 7:
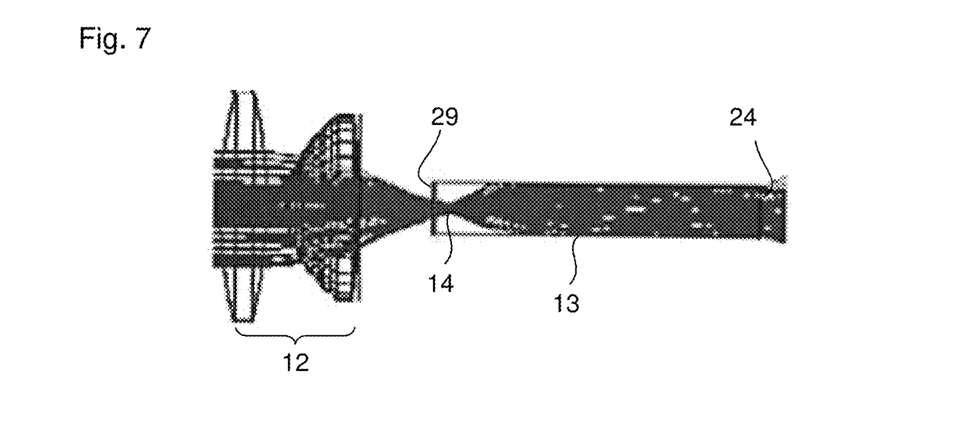
FIG. 7 is a schematic illustration for explaining the position of the first focus in the light mixing rod.

In order to transfer the etendue of each illumination module 4-6 (as completely as possible), it is necessary to image the emission surface of each illumination module 4-6 into the integrator rod 13 for all occurring aperture angles. Here, it is decisive to optimize the imaging according to the coupling efficiency. On account of (spherical) aberrations, the axis-remote focus in the blue channel (first illumination module 4) lies significantly behind (by several mm) the focus of adjacent axis-remote beams of an object point. A caustic network (focal line) is formed. The image field curvature is oriented in such a way that the paraxial image of the light source lies further away than the image of the edge of the source. Within the meaning of achieving maximum coupling efficiency, it was found to be advantageous to place the paraxial focus of the blue illumination module 4 approximately 2 mm from the entry surface 29 of the light mixing rod 13 into the light mixing rod 13, as illustrated schematically in FIG. 7. Consequently, there is a distance of approximately 2 mm between the input 29 of the light rod 13 and the paraxial focus 14 (first focus 14) of the blue light of the first illumination module 4 along the longitudinal direction or axial direction of the light mixing rod 13. Here, longitudinal direction or axial direction of the light mixing rod 13 is understood to mean, in particular, the direction from the input 29 to the output 24 of the light mixing rod 13. This distance of approximately 2 mm can be achieved by virtue of reducing the distance of the first illumination module 4 from the first collimator 7. In this way, the larger aperture angle of the blue source 4 or of the first illumination module 4 is also received by the first collimator 7.

In order also to couple the field edge of the first illumination module 4 (or of the blue light source 4) into the light mixing rod 13 without relatively large losses, the chief beam path for light of the first illumination module 4 is selected upstream of the light mixing rod 13 in such a way that it is slightly convergent. This is achieved by a corresponding enlargement of the pupil spacing upstream of the focusing optical unit 12.

Figure 10:
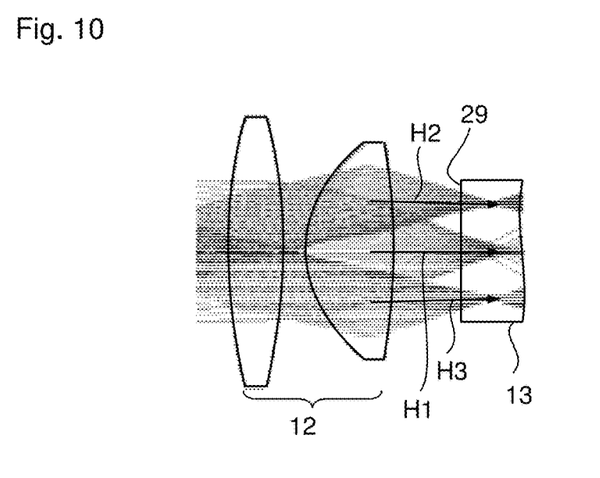
FIG. 10 is a schematic illustration for explaining the convergent chief beam path of the light of the first illumination module before coupling into the light mixing rod.

This convergent chief beam path for light of the first illumination module 4 is illustrated schematically in FIG. 10. Three chief rays H1, H2 and H3 from three different field points of the light source of the first illumination module 4 are elucidated by the added arrows. The chief rays H1-H3 extend in convergent fashion between the focusing optical unit 12 and the light mixing rod 13, and so the described convergent chief beam path is present.

Figure 8:
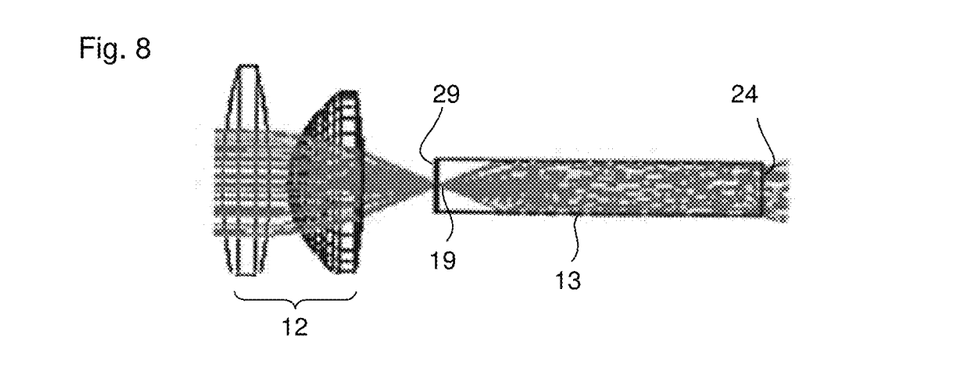
FIG. 8 is a schematic illustration for explaining the position of the second focus in the light mixing rod.
Figure 9:
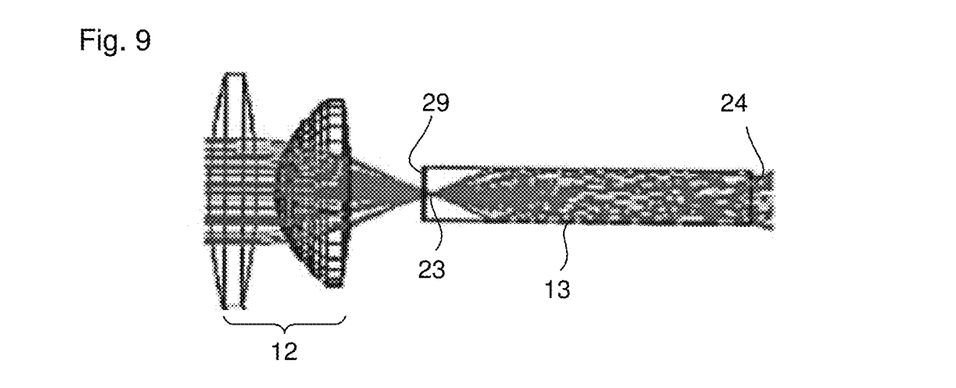
FIG. 9 is a schematic illustration for explaining the position of the third focus in the light mixing rod.

The two other illumination beam paths of the second and third illumination module 5, 6 (consequently, the red and green illumination beam path) use the same lenses (with possibly different anti-reflection coatings) and image the light sources with the same imaging scale in each case into the light mixing rod 13. Here, too, the source-side distance of the second and third collimator 15, 20 was optimized in respect of the coupling efficiency. The paraxial focus 19 (second focus 19) of the light of the second illumination module 5 (FIG. 8) and the paraxial focus 23 (third focus 23) of the light of the third illumination module 6 (FIG. 9) each lie within the light mixing rod 13. On account of the smaller emission angle of the second and third illumination module 5, 6, the spherical aberrations are not as pronounced as in the case of the light of the first illumination module 4. Therefore, the paraxial foci 19, 23 of the light of the second and third illumination module 6, 5 lie closer to the input 29 of the light mixing rod 13. The difference in position of the paraxial foci between the red and green channel (light of the third and second illumination module 6, 5) is 0.5 mm and greater than the longitudinal chromatic aberrations of the optical unit, with none of the employed optical units being achromatized.

If the described efficiency optimization were dispensed with when imaging the light of the illumination modules 4-6 into the light mixing rod 13 and the paraxial source images were placed onto the input 29 of the light mixing rod 13 in each case, the coupling efficiency would reduce by over 10%. Moreover, the homogeneity of the intensity distribution at the output 24 of the light mixing rod 13 would deteriorate because the light from the edge of the corresponding illumination module 4-6 would only still be coupled into the light mixing rod 13 with part of its angle spectrum. Consequently, some of the large outwardly directed angles would be missing from the homogenization.

Figure 11:
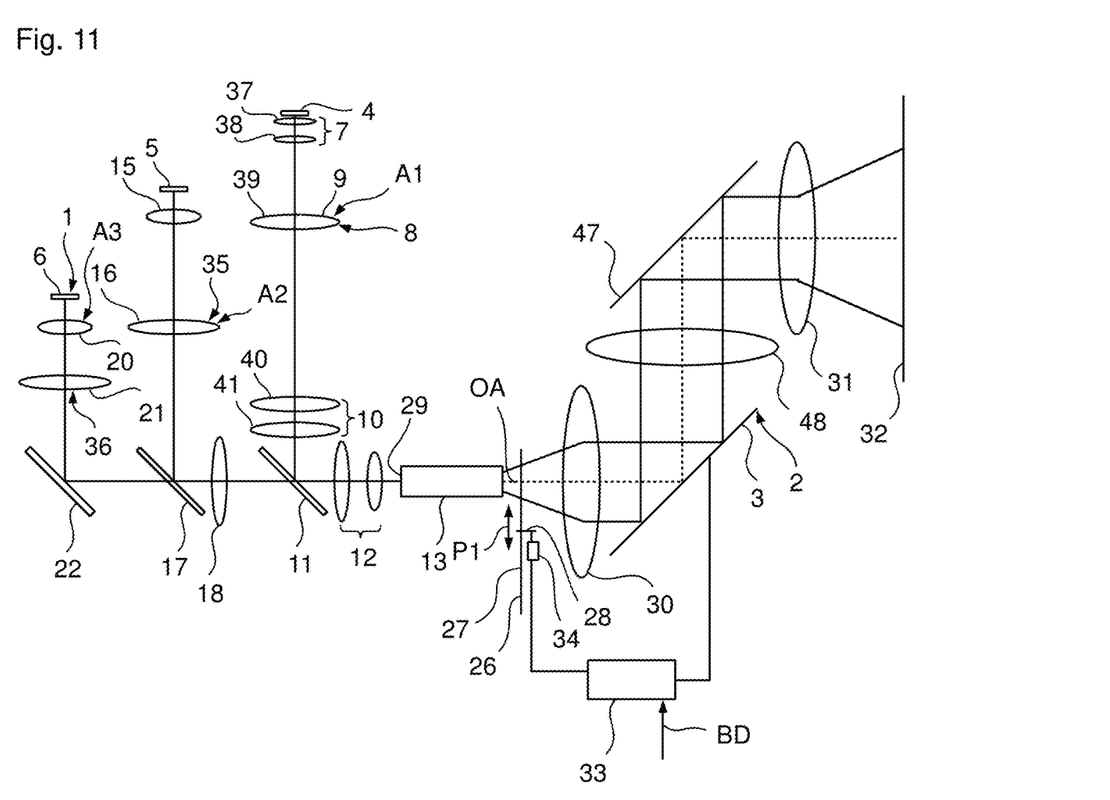
FIG. 11 is a schematic illustration of a second exemplary embodiment of the illumination module according to the invention in a projector.

FIG. 11 shows a further exemplary embodiment of the projector 2 according to the invention, which has an improved contrast since a further light modulator 47 is disposed downstream of the light modulator 3. Preferably, a modulator optical unit 48, which images the light modulator 3 onto the further light modulator 47, is disposed between the two light modulators 3 and 47. By way of example, the modulator optical unit 48 may be a 1:1 imaging optical unit. The connecting lines between the control unit 33 and the illumination modules 4-6 have not been plotted in FIG. 11 in order to simplify the illustration.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. An illumination apparatus for a projector comprising a light modulator, the illumination apparatus comprising:
a first illumination module emitting a first radiation;
a second illumination module emitting a second radiation;
a light mixing rod extending in an axial direction; and
a superposition unit that superposes the first and the second radiation and couples the superposed first and second radiations into the light mixing rod,
wherein the superposition unit comprises:
a first imaging optical unit that focuses the first radiation into the light mixing rod such that a first focus is present within the light mixing rod, and
a second imaging optical unit that focuses the second radiation into the light mixing rod such that a second focus is present within the light mixing rod, and
wherein the first focus is spaced apart from the second focus in the axial direction.

2. The illumination apparatus of claim 1, wherein the first imaging optical unit comprises, in order, a first collimator, a first 4f relay optical unit and a focusing optical unit.

3. The illumination apparatus of claim 2, wherein the first 4f relay optical unit is formed with spherical lenses.

4. The illumination apparatus of claim 2, wherein the distance of the first focus from an input of the light mixing rod in the axial direction is greater than the distance of the second focus from the input.

5. The illumination apparatus of claim 2, wherein the first imaging optical unit is configured such that chief rays of different field points of the first illumination module extend in convergent fashion between the focusing optical unit and the light mixing rod.

6. The illumination apparatus of claim 2, wherein the second imaging optical unit comprises a second collimator and a second 4f relay optical unit and the focusing optical unit.

7. The illumination apparatus of claim 2, further comprising a third illumination module emitting third radiation, wherein the superposition unit comprises a third imaging optical unit which focuses the third radiation into the light mixing rod such that a third focus is present, the latter being spaced apart in the axial direction from the first focus and/or second focus.

8. The illumination apparatus of claim 7, wherein the second 4f relay optical unit comprises a third partial optical unit and a fourth partial optical unit, and wherein the third imaging optical unit comprises a third 4f relay optical unit comprising a fifth partial optical unit and the fourth partial optical unit.

9. The illumination apparatus of claim 2, wherein the first collimator is formed from at least two spherical lenses.

10. The illumination apparatus of claim 6, wherein the second collimator comprises an aspherical lens.

11. The illumination apparatus of claim 1, wherein the distance of the first focus from an input of the light mixing rod in the axial direction is greater than a distance of the second focus from the input.

12. The illumination apparatus of claim 1, wherein the first imaging optical unit is configured such that chief rays of different field points of the first illumination module extend in convergent fashion between a focusing optical unit and the light mixing rod.

13. The illumination apparatus of claim 1, wherein the second imaging optical unit comprises a second collimator and a second 4f relay optical unit and a focusing optical unit.

14. The illumination apparatus of claim 13, further comprising a third illumination module emitting third radiation, wherein the superposition unit comprises a third imaging optical unit which focuses the third radiation into the light mixing rod such that a third focus is present, the latter being spaced apart in the axial direction from the first focus and/or second focus.

15. The illumination apparatus of claim 14, wherein the second 4f relay optical unit comprises a third partial optical unit and a fourth partial optical unit, and wherein the third imaging optical unit comprises a third 4f relay optical unit comprising a fifth partial optical unit and the fourth partial optical unit.

16. The illumination apparatus of claim 2, wherein the first collimator is formed from at least two spherical lenses.

17. The illumination apparatus of claim 13, wherein the second collimator comprises an aspherical lens.

18. A projector comprising a light modulator and an illumination apparatus, the illumination apparatus comprising:
a first illumination module emitting first radiation;
a second illumination module emitting second radiation;
a light mixing rod extending in an axial direction; and a superposition unit, which superposes the first and second radiation and couples the superposed first and second radiation into the light mixing rod,
wherein the superposition unit comprises:
a first imaging optical unit that focuses the first radiation into the light mixing rod such that a first focus is present within the light mixing rod,
a second imaging optical unit that focuses the second radiation into the light mixing rod such that a second focus is present within the light mixing rod,
wherein the first focus is spaced apart from the second focus in the axial direction.

\* \* \* \* \*